United States Patent
Bedi et al.

(10) Patent No.: US 11,176,193 B2
(45) Date of Patent: Nov. 16, 2021

(54) SEARCH INPUT GENERATION FOR IMAGE SEARCH

(71) Applicant: Adobe Inc., San Jose, CA (US)

(72) Inventors: Ajay Bedi, Hamirpur (IN); Sunil Rawat, Faridabad (IN); Rishu Aggarwal, Rohini (IN)

(73) Assignee: Adobe Inc., San Jose, CA (US)

( * ) Notice: Subject to any disclaimer, the term of this patent is extended or adjusted under 35 U.S.C. 154(b) by 186 days.

(21) Appl. No.: 16/663,191

(22) Filed: Oct. 24, 2019

(65) Prior Publication Data

US 2021/0124774 A1   Apr. 29, 2021

(51) Int. Cl.
| G06F 16/00 | (2019.01) |
| G06F 16/583 | (2019.01) |
| G06K 9/00 | (2006.01) |
| G06F 16/538 | (2019.01) |
| G06K 9/20 | (2006.01) |
| G06F 16/535 | (2019.01) |
| G06F 3/0482 | (2013.01) |

(52) U.S. Cl.
CPC ........ *G06F 16/5854* (2019.01); *G06F 3/0482* (2013.01); *G06F 16/535* (2019.01); *G06F 16/538* (2019.01); *G06K 9/00671* (2013.01); *G06K 9/2081* (2013.01)

(58) Field of Classification Search
CPC .. G06F 16/5854; G06F 16/538; G06F 16/535; G06F 3/0482; G06K 9/00671; G06K 9/2081; G06K 9/3233
See application file for complete search history.

(56) References Cited

U.S. PATENT DOCUMENTS

| 7,092,548 B2* | 8/2006 | Laumeyer ......... G06K 9/00818 340/309 |
| 2007/0077025 A1* | 4/2007 | Mino .................. G06F 16/5838 386/241 |
| 2007/0217688 A1* | 9/2007 | Sabe .................. G06K 9/00228 382/226 |
| 2012/0030234 A1* | 2/2012 | Ramachandrula .. G06F 16/5846 707/769 |
| 2012/0033852 A1* | 2/2012 | Kennedy ................. G06K 9/00 382/103 |
| 2014/0019484 A1* | 1/2014 | Coppin ............... G06F 16/5838 |
| 2015/0131851 A1* | 5/2015 | Bernal .................... G06T 7/194 382/103 |

(Continued)

OTHER PUBLICATIONS

Anonymously et al., "Searching Images Based On Refining Desired Image Characteristics", Dec. 14, 2011, pp. 1-4 (Year: 2011).*

(Continued)

*Primary Examiner* — Jared M Bibbee
(74) *Attorney, Agent, or Firm* — FIG. 1 Patents

(57) ABSTRACT

In implementations of search input generation for an image search, a computing device can capture image data of an environment scene that includes multiple objects. The computing device implements a search input module that can detect the multiple objects in the image data, and initiate a display of a selectable indication for each of the multiple objects. The search input module can then determine a subject object from the detected multiple objects, and generate the subject object as the search input for the image search.

20 Claims, 7 Drawing Sheets

(56) References Cited

U.S. PATENT DOCUMENTS

| | | | |
|---|---|---|---|
| 2015/0332119 A1* | 11/2015 | Gupta | G06K 9/6217 |
| | | | 382/195 |
| 2017/0109891 A1* | 4/2017 | Mosher | G06T 5/002 |
| 2018/0189598 A1* | 7/2018 | Cheung | G06K 9/00671 |
| 2018/0341808 A1* | 11/2018 | Holzer | G06F 16/587 |
| 2019/0121879 A1* | 4/2019 | Canelis | G06F 3/04845 |
| 2019/0172223 A1* | 6/2019 | Vajda | G06K 9/4633 |

OTHER PUBLICATIONS

Ejaz Ahmed et al., "Semantic Object Selection", IEEE, pp. 3150-3157 (Year: 2014).*

* cited by examiner

SEARCH INPUT GENERATION FOR IMAGE SEARCH

BACKGROUND

Some image searching platforms allow users to provide an image as a search input to search for similar images or features related to the image. These search platforms are popular because search input images can be easily captured using a mobile device such as a smartphone. For example, a user may admire a co-worker's new shoes and the user may capture an image (e.g., take a picture) of the coworker's shoes and use the image to identify and purchase the same shoes. Because of this popularity, many online retailers offer a search by image service for their products.

Generally, search platforms will use all of the objects depicted in a search input image, even though only one object may be of interest to the user. As a result, many searches based on input images do not return desired or expected results. For example, if the user admired the co-worker's new earrings and captured an image depicting the earrings for use as a search input, then the captured image would likely include other objects such as a face, glasses, a necklace, a hat, etc. In this example, the other objects are noise in the captured image which makes it very unlikely that the search platform will successfully return results related to the earrings.

Some conventional systems for generating images as search inputs allow a user to zoom-in on objects in order to focus the search on an object of interest. However, even a zoomed-in image can include overlapping objects, and often fails to focus the search on the object of interest, as well as reduces the quality of the image and the representation of the object of interest. This further reduces the likelihood that a search using an input image will return results related to the object of interest, resulting in an overall poor user experience.

SUMMARY

Systems and techniques are described for search input generation for an image search. In an example, image data of an environment scene including objects is captured. This image data is processed to detect the objects. A selectable indication of each detected object is displayed in a user interface. The system determines a subject object from the detected objects, and the subject object is generated as the search input for the image search. The system generates the search input as excluding detected objects other than the subject object so that a search based on the input will focus on the subject object.

The described systems improve conventional technology for generating search inputs by generating search inputs that are specific to a subject object of interest. This includes scenarios in which the subject object is overlapping the other detected objects or the other detected objects are overlapping the subject object which is not possible using conventional zooming techniques. The described systems and techniques greatly increase the likelihood that an image search conducted based on the search input will return results related to the subject object by removing the noise caused by the other detected objects in the image data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
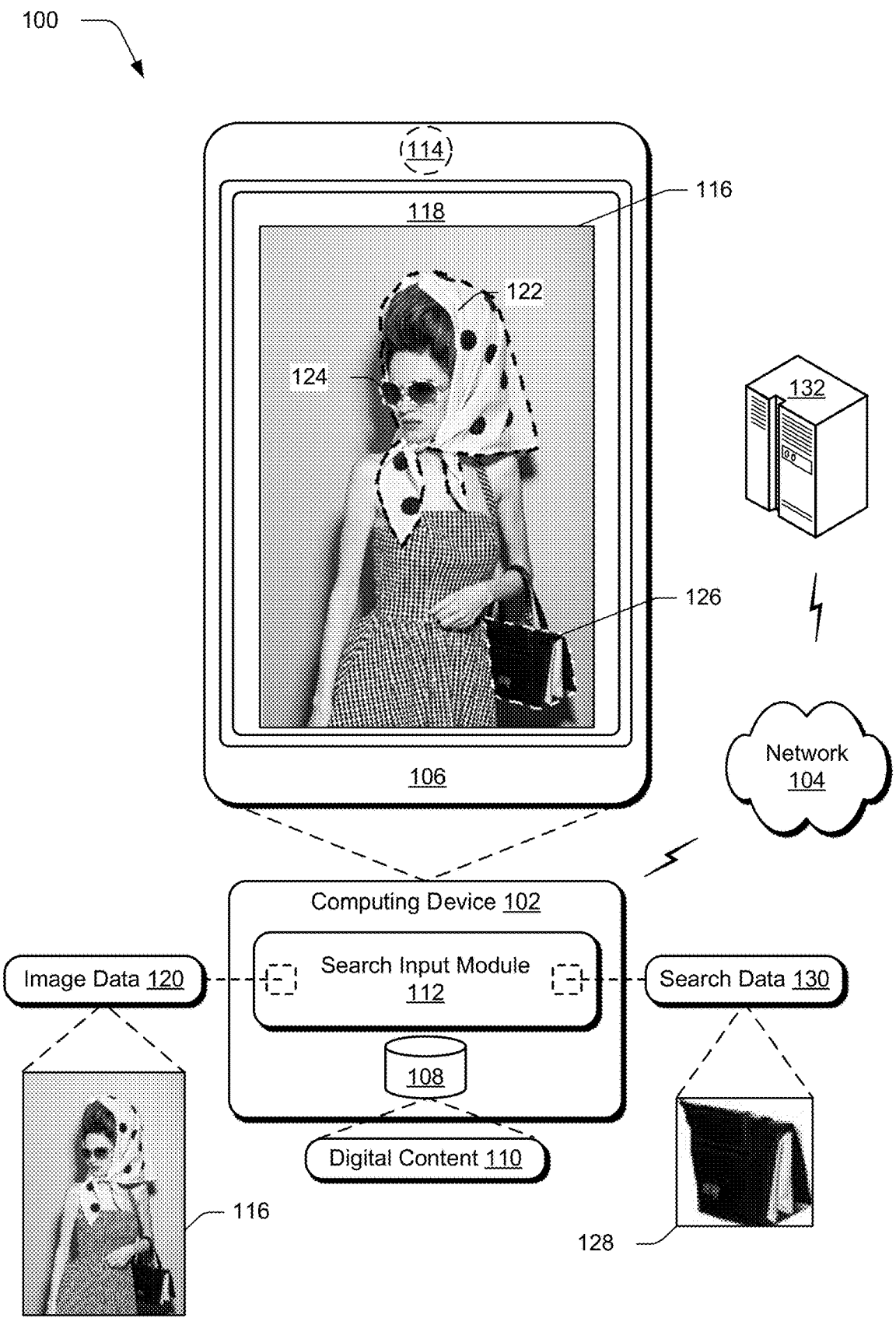
FIG. 1 is an illustration of an environment in an example implementation that is operable to employ digital systems and techniques as described herein.

Some image searching platforms can receive a search input in the form of an input image, and these searching platforms return similar images or features as search results related to the input image. When the input image depicts multiple different objects, a searching platform may not be able to discern which object of the multiple different objects is of interest to a user. As a result, searches conducted based on image search inputs including multiple objects rarely return desired results.

Consider an example in which a user is interested in a dress worn by a model at a fashion show, and the user captures an image of the model wearing the dress with a camera of the user's smartphone. In this example, the user wants to know more about the dress and provides the captured image as a search input to an image search service. As used herein, the term "image search service" refers to a searching platform capable of performing searches based on search input images.

The image search service receives the input image and conducts a search based on the input image. The input image depicts the dress but other objects are also depicted in the image such as a handbag, a hat, a neckless, and the model. These other objects are noise and their inclusion in the input image causes the image search service to fail to return results related to the dress of interest to the user resulting in a negative user experience.

Conventional systems for generating inputs for image searches enable users to zoom-in on an object of interest in an image to focus the scope of a search on the object of interest. However, this zooming functionality is unable to reliably focus on one object of multiple overlapping objects or on one object of multiple objects in close proximity. Zooming-in on an image also reduces the quality of the image which reduces the likelihood that a search using the image will return results related to the object of interest.

Consider the previous example in which the user is interested in the dress and captured the image of the model wearing the dress for use as a search input. In this continued example, the user recognizes that the captured image depicts the dress, the handbag, the hat, the neckless, and the model. In an effort to focus the search on the dress, the user may attempt to zoom-in on the dress. However, in this example, the handbag and the neckless are overlapping the dress in the captured image. Since these objects are overlapping, the user's initial attempt to zoom-in on the dress depicts the dress, the handbag, and the neckless. As used herein the term "overlapping objects" refers to objects depicted in an image such that at least a portion of a first object overlaps at least a portion of a second object. The portion of the first object is in a foreground of the image relative to the portion of the second object and the portion of the second object is in a background of the image relative to the portion of the first object. Overlapping objects can include more than two objects.

The user provides the zoomed-in image as an input image to the image search service which conducts a search based on the zoomed-in input image. Again, the handbag and the neckless are noise relative to the dress and this noise causes the image search service to fail to return search results which are related to the dress. In another attempt to focus the search on the dress, the user may zoom-in further on the portion of the captured image depicting the dress. The user provides this further zoomed-in image as an input image to the image search service. In this example, the further zoomed-in image no longer depicts the neckless and the handbag; however, the outline of the dress is also no longer depicted and a decorative pattern of the dress is now blurry. The image search service conducts a search based on the further zoomed-in input image but fails to return results related to the dress of interest to the user.

To resolve these shortcomings, systems and techniques are described for search input generation for an image search. A computing device implements a search input system which can receive captured image data of an environment scene that includes multiple objects. In one example, the search input system may receive the captured image data in the form of an image, e.g., an image captured by a camera of a user's smartphone. In another example, the system receives the image data from an image capture device of the computing device which may be raw or minimally processed image data.

The system processes the image data to detect objects included in the image data. For example, the system may process the image data using trained convolutional neural networks such as a region proposal network of a Faster R-Convolutional Neural Network (Faster R-CNN). In this example, the search input system detects the objects in the image data by generating boundaries and corresponding labels which can include a bounding box, a confidence score, and a label for objects detected in the image data. The search input system can utilize any known technique or combinations of techniques for object detection to detect the objects included in the image data.

The system also generates a mask for each detected object which may be used to segment the detected objects. In one example, the search input system generates these masks by segmenting the objects as foreground objects from the bounding boxes generated as part of detecting the objects in the image data. In another example, the search input system generates a mask for each detected object using a trained convolutional neural network such as GoogLeNet. The system can utilize any known technique or combinations of techniques for mask generation to generate a mask for each detected object.

In the example in which the user is interested in the dress worn by the model, the described systems can receive the captured image depicting the dress, the handbag, the hat, the neckless, and the model as the image data. In this example, the search input system processes the captured image to detect the dress, the handbag, the hat, the neckless, and the model as objects depicted in the captured image. The system can then segment these detected objects by generating a mask for each of the objects.

A default object of the detected objects is determined based on data from an image capture device used to capture the image data. As used herein, the term "default object" refers to a detected object in image data. In one example, the system determines a focus region from the image capture device data. The system can intersect the mask corresponding to each detected object with the focus region. The object corresponding to the mask having the greatest overlap area with the focus region is determined as the default object in this example.

A selectable indication of the default object is rendered in a user interface along with selectable indications for each object detected in the image data. The search input system determines a subject object from the detected objects, e.g., based on a user input. As used herein, the term "subject object" refers to a detected object in image data that is of interest to a user. By way of example, the subject object can be the default object or another object. The system generates the subject object as a search input for the image search using its corresponding mask. In this way, detected objects other than the subject object are excluded from the search input.

Returning to the example in which the user is interested in the dress worn by the model, the search input system can receive the data from the user's smartphone and determine a focus region of the user's camera. The system then intersects the focus region with the generated mask corresponding to each of the dress, the handbag, the hat, the neckless, and the model, and the system determines the handbag as the default object. For example, the mask corresponding to the handbag may have a greater overlap area with the focus region than the masks corresponding to the dress, the hat, the neckless, and the model.

In this example, the search input system generates a selectable indication of the handbag along with a selectable indication of the other detected objects in a user interface of the user's smartphone. The system also generates an indication that the handbag is the default object in the user interface. The system receives a user input as a selection of the dress and the system determines the dress as the subject object.

The search input system then generates the dress as the search input using the mask corresponding to the dress, and the system provides the search input to the image search service. The image search service receives the search input which excludes the handbag, the hat, the neckless, and the model. The image search service conducts a search based on the search input and returns search results relating to the dress.

The described systems improve conventional technology for generating search inputs by generating search inputs that are specific to a subject object of interest. This includes scenarios in which the subject object and the other detected objects are overlapping which is not possible using conventional zooming techniques. The generated search input can be provided to the image search service without the noise of the other detected objects. In this manner, the likelihood that a search conducted based on the search input will return results related to the subject object is significantly increased.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 that may be connected to a network 104. The computing device 102 may be configured as a desktop computer, a laptop computer, a mobile device (e.g., assuming a handheld configuration such as a tablet or mobile phone), and so forth. Additionally, the computing device 102 may be representative of a plurality of different devices, such as multiple servers utilized by a business to perform operations "over the cloud."

The illustrated environment 100 also includes a display device 106 to display a captured image. A variety of device configurations may be used to implement the computing device 102 and/or the display device 106. The computing device 102 includes a storage device 108, which is illustrated to include digital content 110. The computing device 102 also includes a search input module 112 that implements the techniques and features of search input generation for image searches, as described herein.

The computing device 102 and/or the display device 106 includes an image capture device 114 such as a digital camera. In some examples, the image capture device 114 may be included as part of the computing device 102 such as in examples in which the computing device 102 is configured as a mobile device. In the illustrated example, the computing device 102 is a mobile device (e.g., a smartphone) and the image capture device 114 is a digital camera of the mobile device. In other examples, the image capture device 114 may be communicatively coupled to the computing device 102 via a wireless or a wired connection.

The image capture device 114 can be implemented to capture a digital image 116 which is rendered in a user interface 118 of the display device 106 and also included in image data 120. The search input module 112 is illustrated as having, receiving, and/or transmitting the image data 120. For example, the computing device 102 may implement the search input module 112 to receive the image data 120, and the search input module 112 processes the image data 120 to detect objects in the image data 120.

The search input module 112 generates an indication for each object detected in the image data 120. In this example, the search input module 112 has detected objects including a scarf, a pair of sunglasses, and a bag in the image data 120, and the search input module 112 has rendered indications of the scarf 122, the pair of sunglasses 124, and the bag 126 over the digital image 116 in the user interface 118. The search input module 112 is implemented to determine a subject object from the detected objects. In the illustrated example, the bag 126 is determined as the subject object and the search input module 110 generates the bag 126 as a search input 128 for an image search. As shown, the search input 128 includes the bag 126 but does not include the scarf 122 or the pair of sunglasses 124.

The search input 128 is illustrated to be included as part of search data 130. The computing device 102 implements the search input module 112 to communicate the search data 130 to an image search service 132 via the network 104. The image search service 132 conducts a search based on the search input 128 included in the search data 130. The image search service 132 communicates search results to the search input module 112 which receives the results via the network 104.

Figure 2:
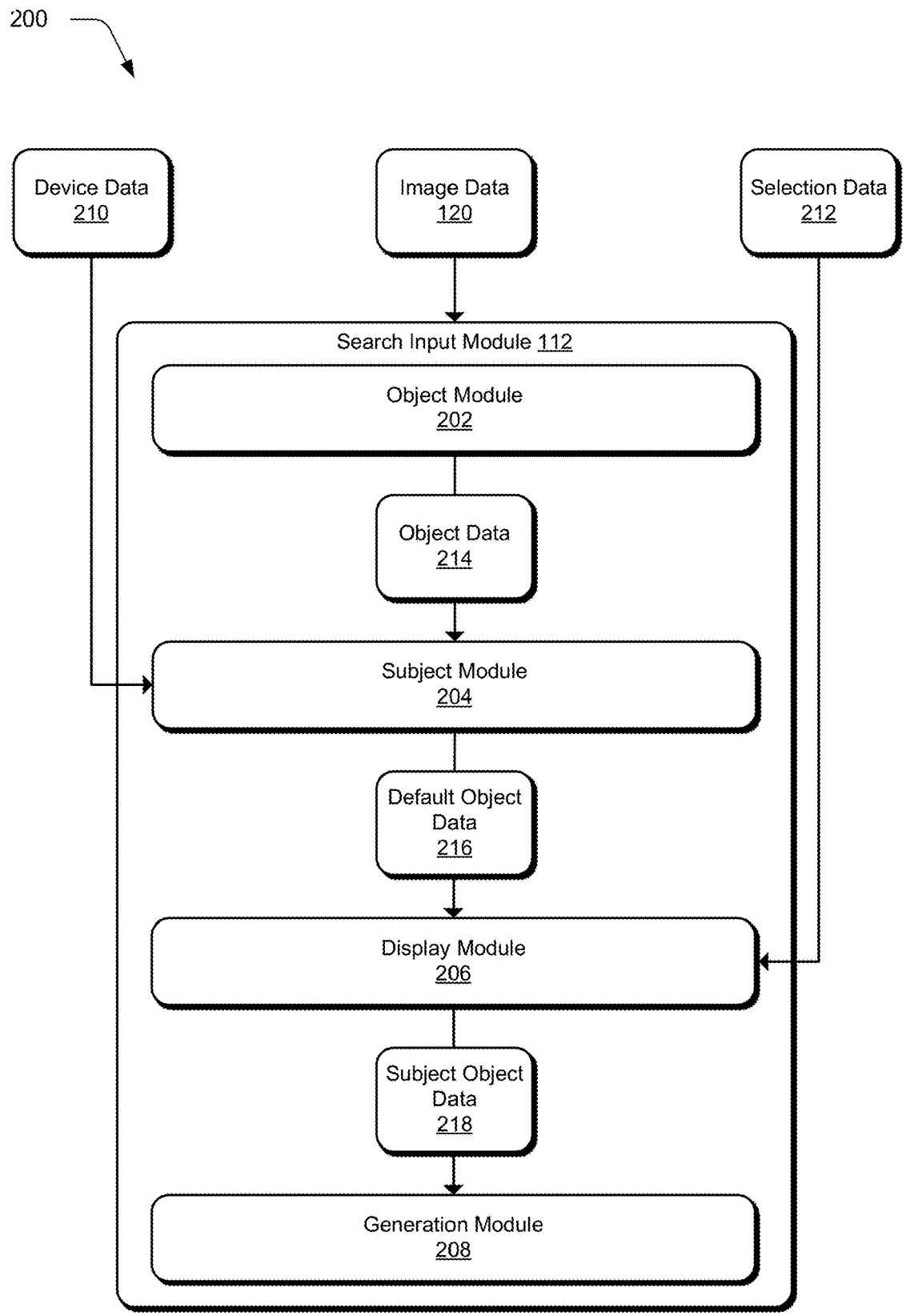
FIG. 2 depicts a system in an example implementation showing operation of a search input module.

FIG. 2 depicts a system 200 in an example implementation showing operation of the search input module 112. The search input module 112 is illustrated to include an object module 202, a subject module 204, a display module 206, and a generation module 208. The computing device 102 implements the search input module 112 to receive input data which can include image data 120, device data 210, and selection data 212.

The image data 120 describes an environment scene that includes objects, and the image data 120 may be captured by the image capture device 114. For example, the image capture device 114 can include a digital camera and the image data 120 may include an analog signal (e.g., received from an image sensor of the image capture device 114) and/or a digital signal (e.g., received from an analog to digital converter of the image capture device 114). Thus, the image data 120 can include raw image data and/or processed image data such as the digital image 116.

The object module 202 receives the image data 120 and processes the image data 120 to detect objects included in the image data 120. For example, the object module 202 can include a region proposal network of a Faster R-Convolutional Neural Network (Faster R-CNN) using a convolutional neural network such as ResNet-101 pre-trained on the Open-Images dataset. The object module 202 generates object data 214 that describes detected objects in the image data 120.

In one example, the object module 202 generates the object data 214 by processing the image data 120 to generate object boundaries and corresponding labels which can include a bounding box, a confidence score, and a label for objects detected in the image data 120. In this example, the object module 202 outputs masks for the objects detected in the image data 120 by segmenting a foreground object in each bounding box using a customized model architecture such as a customized GoogLeNet model architecture and a dataset including COCO, THUS10000, DUTOmron, and internally annotated data. In this manner, the object module 202 generates the object data 214 as including a mask for each object detected in the image data 120.

The subject module 204 receives the object data 214 and the device data 210 and the subject module 204 processes the object data 214 and the device data 210 to determine a default object from the detected objects in the image data 120. The device data 210 describes a field of view of the image capture device 114. The device data 210 also describes a focus point and a focus region of the image capture device 114. The focus point and the focus region of the image capture device 114 correspond to a focus point and a focus region of the environment scene, respectively. Thus, the subject module 204 processes the device data 210 to identify the focus point and the focus region of the environment scene.

In one example, the subject module 204 processes the object data 214 and the device data 210 by iteratively intersecting the masks of the detected objects and the focus region of the image capture device 114. In this example, the subject module 204 determines the default object as the detected object having the greatest overlap area with the focus region of the image capture device 114. In this way, the subject module 204 determines the default object based on the focus region of the image capture device 114. However, other techniques for determining the default object are contemplated.

For example, the subject module 204 may determine the default object as the largest object of the detected objects. In one example, the subject module 204 determines the default object as the object having a corresponding centroid that is nearest to the center of the focus region of the image capture device 114. In another example, the subject module 204 determines the default object based on other device data 210 such as the focus point or the field of view of the image capture device 114. For example, the subject module 204 can determine the default object as the detected object occupying a greatest percentage of the field of view or the subject module 204 may determine the default object as any object which intersects the focus point.

In an example, the subject module 204 may determine the default object based on a point of reference in the environment scene. In this example, the subject module 204 may identify the point of reference in the environment scene and determine the default object as being a detected object that is closer to the point of reference than the other detected objects. For example, the point of reference of the environment scene may be a center of the environment scene, a field of view of the environment scene, etc. In one example, the point of reference of the environment scene can be based on receiving a user input.

In some examples, the subject module 204 is implemented to determine the default object in real time as the device data 210 and/or the object data 214 is received. The subject module 204 generates default object data 216 which describes the detected object determined as the default object as well as the other objects detected in the image data 120. For example, the subject module 204 generates default object data 216 to include the object data 214.

The display module 206 receives the default object data 216 and the display module 206 processes the default object data 216 to render a selectable indication for each object detected in the image data 120, e.g., in the user interface 118 of the display device 106. The display module 206 renders the selectable indications for the detected objects as well as an indication of which of the detected objects is the default object. For example, the display module 206 may render the indication of the default object in a manner to visually differentiate the default object from the other detected objects by highlighting the default object and/or uniquely coloring the default object.

The display module 206 is also implemented to receive selection data 212 which includes an indication of a subject object. For example, the default object is the subject object unless a user selects a different detected object as the subject object. In one example, the user can select a different detected object as the subject object through interaction in the user interface 118 such as by providing a user input indicating the different object as the subject object. In an example in which the user interface 118 includes a touch-screen, the user input can be provided by tapping or contacting the indication of the different object with a stylus or a digit of the user.

The display module 206 receives the selection data 212 and the display module 206 processes the selection data 212 to identify the subject object. Based on this processing, the display module 206 determines whether the subject object is the default object or another detected object. The display module 206 is further implemented to generate subject object data 218 which describes the determined subject object based on the selection data 212.

The generation module 208 receives the subject object data 218 and the generation module 208 processes the subject object data 218 to generate a search input for an image search. To do so, the generation module 208 generates the subject object as the search input by generating an image including the mask corresponding to the subject object and masking out background and all of the other detected objects. In this way, the generation module 208 generates the search input as including only the subject object. By generating the search input in this manner, the generation module 208 significantly increases the likelihood that the subject object of interest will be identified in the image search.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

Figure 3:
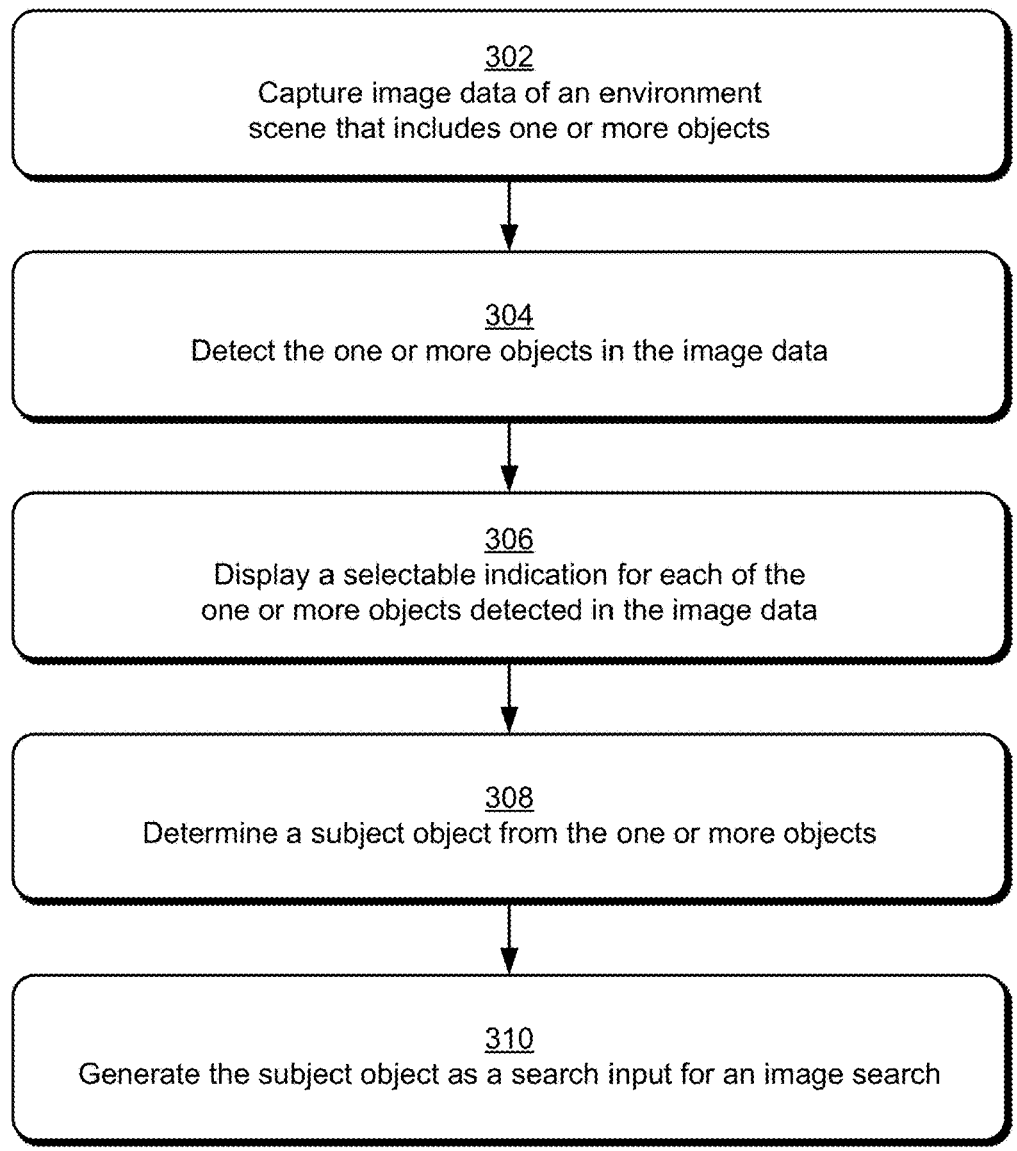
FIG. 3 is a flow diagram depicting a procedure in an example implementation in which image data of an environment scene is captured, one or more objects are detected in the image data, and a subject object of the one or more objects is generated as a search input for an image search.

FIG. 3 is a flow diagram depicting a procedure 300 in an example implementation in which image data of an environment scene is captured, one or more objects are detected in the image data, and a subject object of the one or more objects is generated as a search input for an image search. Image data of an environment scene that includes one or more objects is captured (at 302). For example, the computing device 102 may receive the captured image data from the image capture device 114. The one or more objects in the image data are detected (at 304). The search input module 112 may be implemented to detect the one or more objects in the image data.

A selectable indication for each of the one or more objects detected in the image data is displayed (at 306). The search input module 112 can render the selectable indication for each of the one or more objects detected in the user interface 118 of the display device 106. A subject object is determined from the one or more objects (at 308). For example, the search input module 112 determines the subject object from the one or more objects. The subject object is generated as a search input for an image search (at 310). The search input module 112 can be implemented to generate the subject object as the search input for the image search.

Example Representations

Figure 4:
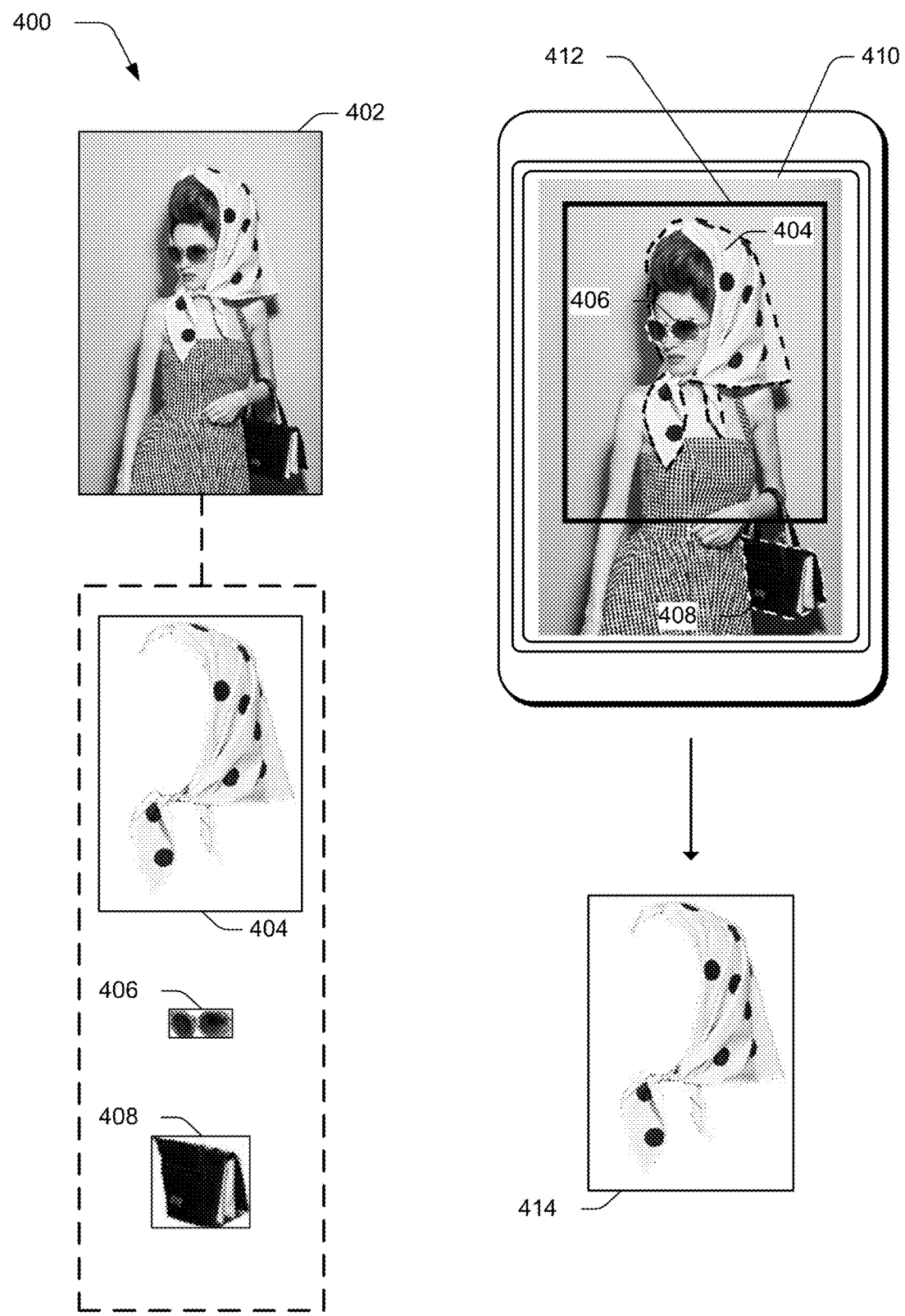
FIG. 4 is an illustration of a representation of generating a search input for an image search based on device data.

FIG. 4 is an illustration of a representation 400 of generating a search input for an image search based on device data. The representation 400 includes a rendering 402 of captured image data of an environment scene that includes objects. As shown, the rendering 402 includes a scarf 404, a pair of sunglasses 406, and a bag 408. The computing device 102 can implement the search input module 112 to receive the rendering 402 and identify the scarf 404, the pair of sunglasses 406, and the bag 408. The search input module 112 is also implemented to output a user interface 410 which includes selectable indications of the detected scarf 404, the detected pair of sunglasses 406, and the detected bag 408. The user interface 410 also includes an indication of a default object which may be determined by the search input module 112 based on a focus region 412 of an image capture device used to capture the image data used to generate the rendering 402.

In one example, the search input module 112 determines which of the scarf 404, the pair of sunglasses 406, and the bag 408 is the default object by intersecting a mask corresponding to each of the detected objects with the focus region 412. In this example, the search input module 112 determines the object having a corresponding mask with the greatest overlap area with the focus region 412 as the default object. As illustrated, the indication of the bag 408 does not overlap the focus region 412 while the indications of the pair of sunglasses 406 and the scarf 404 are both disposed entirely within the focus region 412. The search input module 112 determines the scarf 404 as the default object because the scarf has a greater area of overlap with the focus region 412 than the pair of sunglasses 406. In this example, the default object is also the subject object of interest and the search input module 112 generates the scarf 404 as a search input 414 for the image search.

The computing device 102 then implements the search input module 112 to communicate the search input 414 to the image search service 132, e.g., as part of the search data 130. The image search service 132 receives the search data 130 and conducts the search based on the search input 414. The search input module 112 receives search results related to the scarf 404 from the image search service 132 via the network 104.

Figure 5:
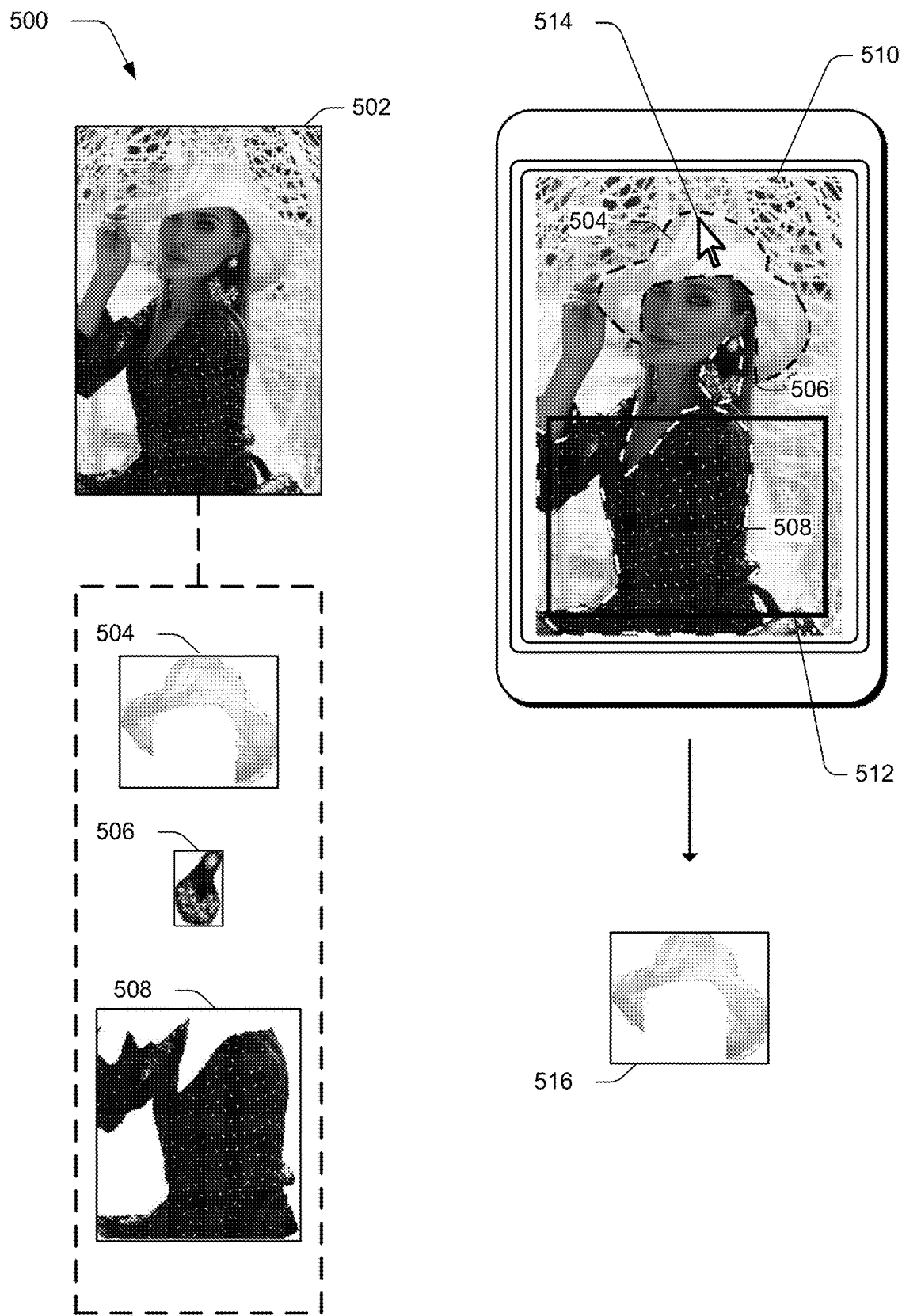
FIG. 5 is an illustration of a representation of generating a search input for an image search based on a user selection.

FIG. 5 is an illustration of a representation 500 of generating a search input for an image search based on a user selection. The representation 500 includes a rendering 502 of captured image data of an environment scene that includes objects. As shown, the rendering 502 includes a hat 504, an earring 506, and a dress 508. The search input module 112 is implemented to receive the rendering 502 and identify the hat 504, the earring 506, and the dress 508. For example, the search input module 112 is also implemented to output a user interface 510 which includes selectable indications for the detected hat 504, the detected earring 506, and the detected dress 508. The user interface 510 also includes an indication of a default object which the search input module 112 determines based on a focus region 512 of an image capture device that captured the image data used to generate the rendering 502.

In this example, the search input module 112 determines the dress 508 as the default object because the dress 508 has the greatest area of overlap with the focus region 512 compared to the hat 504 and the earring 506 which are both outside of the focus region 512. However, the search input module 112 does not determine the dress 508 as the subject object because the search input module 112 receives a user selection of the hat 504 as the subject object as illustrated by indication 514. Accordingly, the search input module 112 generates the hat 504 as a search input 516 for the image search.

The search input module 112 communicates the search input 516 to the image search service 132 as part of the search data 130. The image search service 132 receives the search data 130 and conducts the search based on the search input 516. The search input module 112 receives search results related to the hat 504 from the image search service 132 via the network 104.

In the illustrated example, the search input 516 is generated using a mask of the hat 504 and an image search service 132 performs a search based on the hat 504 as it appears in the rendering 502. In other examples, the search input module 112 provides functionality in which features of the search input 516 may include modifications to the subject object. For example, a user may be interested in the shape of the hat 504 but the user may be indifferent as to a color of the hat 504 or a texture/pattern of the hat's 504 material. In this example, the search input module 112 can generate the search input 516 as including the shape of the hat 504 but excluding the hat's 504 color and material texture/pattern. The image search service 132 can receive the search input 516 including the shape of the hat 504 and the image search service 132 can perform a search based on the search input 516.

In some examples, the user can indicate preferences for generation of the search input 516 as part of selection of a subject object. For example, the user can indicate ways in which the subject object should be modified to generate the search input 516. Example modifications to a subject object include modifications to visual attributes like shape, pattern, color, etc. In this way, the search input module 112 can be implemented to expand or narrow the results of a search performed by the image search service 132 based on modifications to the search input 516.

Although the illustrated examples show a single subject object for generating the search input 516, the functionality of the described systems is not limited to a single subject object. In some examples, the search input module 112 is implemented to include multiple subject objects in a search input. For example, the earring 506 may frequently appear in pairs such that a particular image search service 132 may return improved search results based on a search input including two earrings 506. Thus, the search input module 112 can generate a search input including multiples of an object or multiple different objects.

Figure 6:
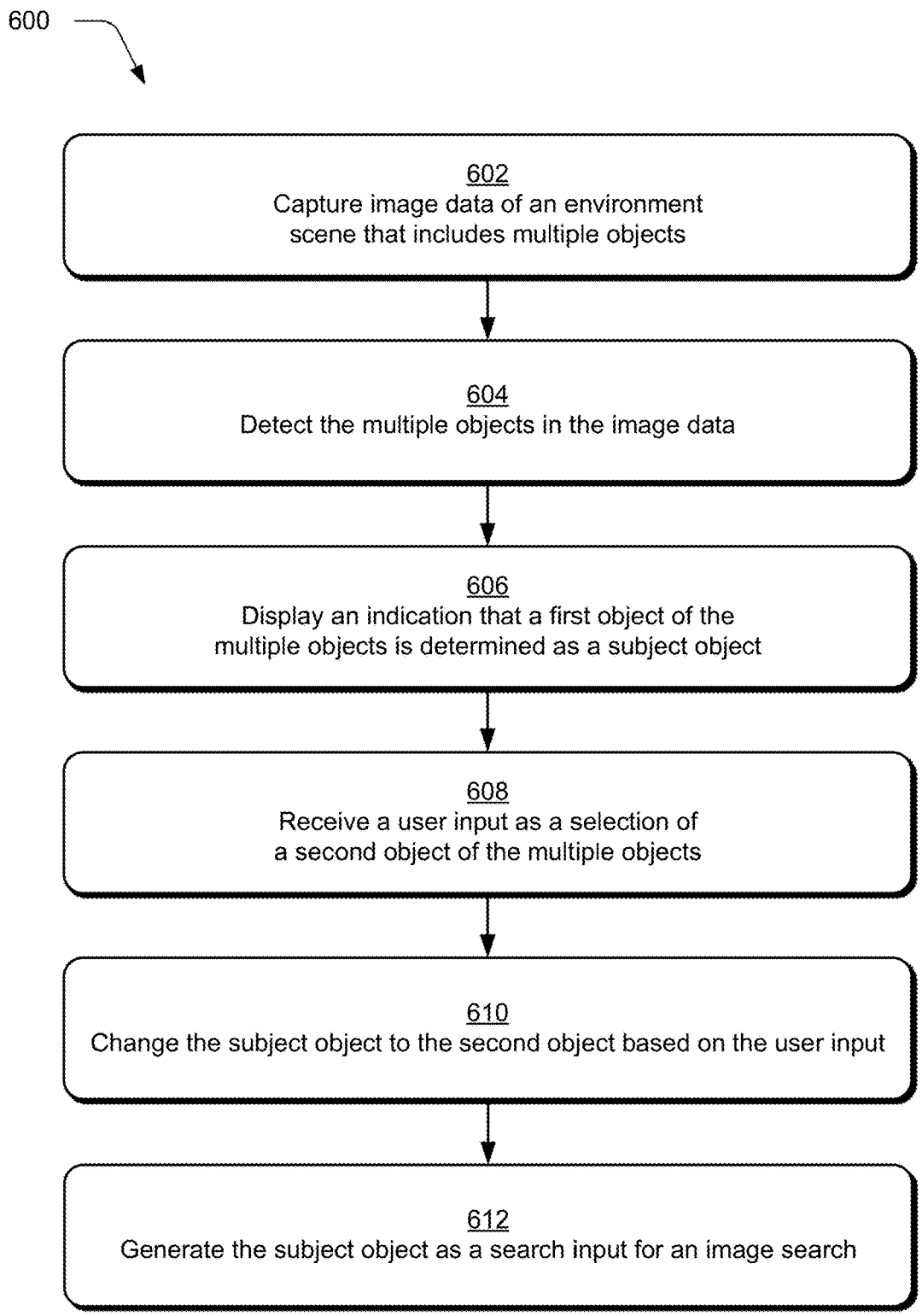
FIG. 6 is a flow diagram depicting a procedure in an example implementation in which image data of an environment scene is captured, multiple objects are detected in the image data, a user input is received as a selection of a subject object, and the subject object is generated as a search input for an image search.

FIG. 6 is a flow diagram depicting a procedure 600 in an example implementation in which image data of an environment scene is captured, multiple objects are detected in the image data, a user input is received as a selection of a subject object, and the subject object is generated as a search input for an image search. Image data of an environment scene that includes multiple objects is captured (at 602). The image capture device 114 can be implemented to capture the image data. The multiple objects in the image data are detected (at 604). For example, the search input module 112 may be implemented to detect the multiple objects.

An indication that a first object of the multiple objects is determined as a subject object is displayed (at 606). The search input module 112 can initiate a display of the indication that the first object is determined as the subject object. A user input is received (at 608) as a selection of a second object of the multiple objects. For example, the search input module 112 can receive the user input as the selection of the second object.

The subject object is changed (at 610) to the second object based on the user input. The search input module 112 can change the subject object to the second object based on the user input. The subject object is generated (at 612) as a search input for an image search. For example, the computing device 102 can implement the search input module 112 to generate the subject object as the search input for the image search.

Example System and Device

Figure 7:
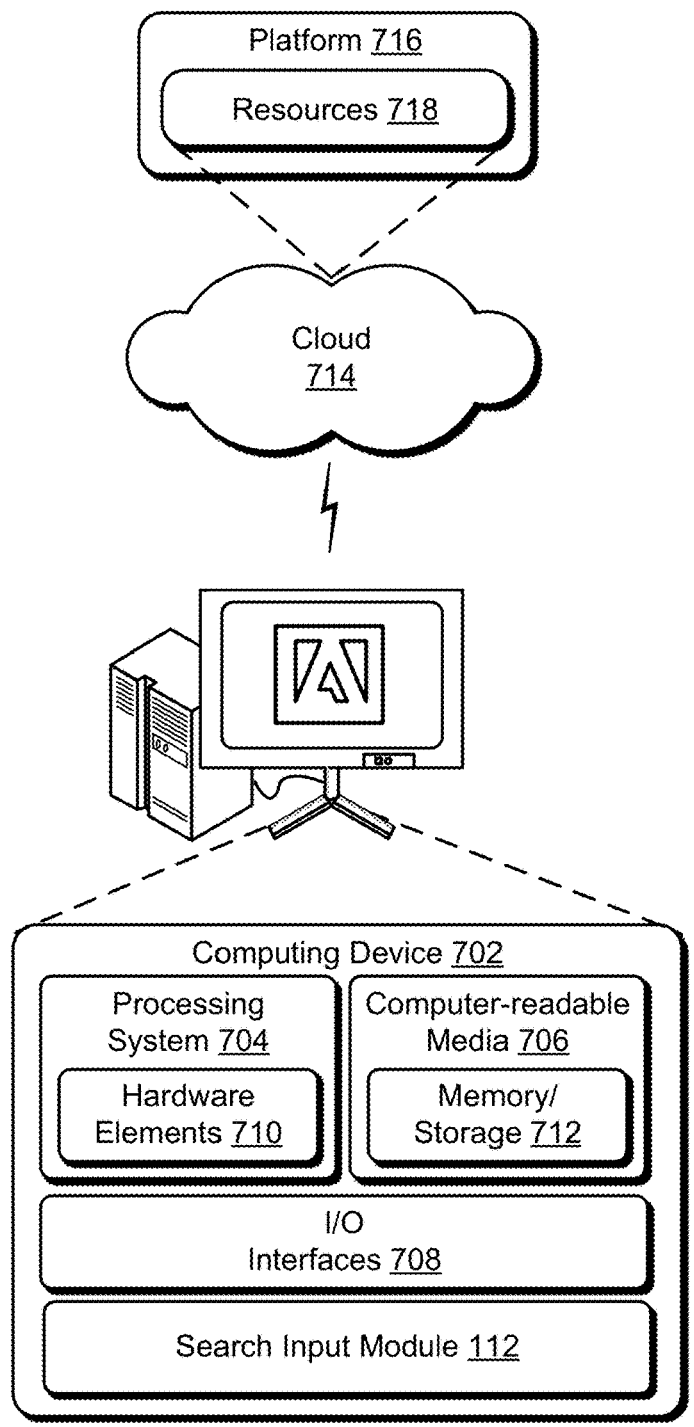
FIG. 7 illustrates an example system that includes an example computing device that is representative of one or more computing systems and/or devices that may implement the various techniques described herein.

FIG. 7 illustrates an example system 700 that includes an example computing device that is representative of one or more computing systems and/or devices that may implement the various techniques described herein. This is illustrated through inclusion of the search input module 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources 718 and functions to connect the computing device 702 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although implementations of search input generation for an image search have been described in language specific to structural features and/or methods, it is to be understood that the appended claims are not necessarily limited to the specific features or methods described. Rather, the specific features and methods are disclosed as example implementations of search input generation for an image search, and other equivalent features and methods are intended to be within the scope of the appended claims. Further, various different examples are described and it is to be appreciated that each described example can be implemented independently or in connection with one or more other described examples.

What is claimed is:

1. In a digital medium environment to generate a search input for an image search, a method implemented by a computing device, the method comprising:
   capturing image data of an environment scene that includes one or more objects using an image capture device included with or coupled to the computing device;
   receiving device data describing a field of view, a focus region, and a focus point of the image capture device;
   detecting the objects in the image data and generating a mask for each of the detected objects;
   determining a default object of the detected objects by intersecting the mask for each of the detected objects with the focus region of the image capture device;
   displaying a selectable indication for each of the detected objects including the default object;
   determining a subject object from the detected objects; and
   generating the subject object as the search input for the image search.

2. One or more computer-readable storage media comprising instructions stored thereon that, responsive to execution by a computing device, cause operations of the computing device including:
   capturing image data of an environment scene that includes multiple objects using an image capture device of the computing device;
   receiving device data describing a field of view, a focus region, and a focus point of the image capture device;
   detecting the multiple objects in the image data and generating a mask for each of the detected multiple objects;
   determining a default object of the detected multiple objects by intersecting the mask for each of the detected multiple objects with the focus region of the image capture device;
   displaying a selectable indication for each of the detected multiple objects;
   determining a subject object of the detected multiple objects; and
   generating the subject object as a search input for an image search.

3. The one or more computer-readable storage media as described in claim 2, wherein the operations of the computing device further include receiving image search results corresponding to the subject object.

4. In a digital medium environment to generate a search input for an image search, a system comprising:
   a display device to display image data of an environment scene that includes multiple objects, the image data is captured using an image capture device included with a computing device;
   a search input module implemented at least partially in computer hardware of the computing device to:

receive device data describing a field of view, a focus region, and a focus point of the image capture device;

detect the multiple objects from the image data of the environment scene and generate a mask for each of the detected multiple objects;

determine a default object of the detected multiple objects by intersecting the mask for each of the detected multiple objects with the focus region of the image capture device;

initiate a display of a selectable indication for each of the detected multiple objects over the image data of the environment scene;

determine a subject object from the detected multiple objects; and generate the subject object as the search input for the image search.

5. The system as described in claim 4, wherein the search input module is further implemented to:

identify a point of reference in the environment scene; and determine the subject object based on the subject object being a nearest detected object of the detected multiple objects to the point of reference.

6. The method as described in claim 1, wherein the default object is determined based on the focus point of the image capture device.

7. The method as described in claim 1, wherein the default object is determined based on the field of view of the image capture device.

8. The method as described in claim 1, wherein the default object is determined based on a centroid of the default object and a center of the focus region of the image capture device.

9. The method as described in claim 1, further comprising receiving image search results corresponding to the subject object.

10. The method as described in claim 1, wherein the subject object is the default object.

11. The method as described in claim 1, wherein the subject object is not the default object.

12. The one or more computer-readable storage media as described in claim 2, wherein the subject object is the default object.

13. The one or more computer-readable storage media as described in claim 2, wherein the subject object is not the default object.

14. The one or more computer-readable storage media as described in claim 2, wherein the default object is determined based on the focus point of the image capture device.

15. The one or more computer-readable storage media as described in claim 2, wherein the default object is determined based on the field of view of the image capture device.

16. The one or more computer-readable storage media as described in claim 2, wherein the default object is determined based on a centroid of the default object and a center of the focus region of the image capture device.

17. The system as described in claim 4, wherein the subject object is the default object.

18. The system as described in claim 4, wherein the subject object is not the default object.

19. The system as described in claim 4, wherein the default object is determined based on the field of view of the image capture device.

20. The system as described in claim 4, wherein the default object is determined based on the focus point of the image capture device.

* * * * *

UNITED STATES PATENT AND TRADEMARK OFFICE
CERTIFICATE OF CORRECTION

| | |
|---|---|
| PATENT NO. | : 11,176,193 B2 |
| APPLICATION NO. | : 16/663191 |
| DATED | : November 16, 2021 |
| INVENTOR(S) | : Ajay Bedi, Sunil Rawat and Rishu Aggarwal |

It is certified that error appears in the above-identified patent and that said Letters Patent is hereby corrected as shown below:

In the Claims

Column 14, Line 18, Claim 1: after "includes", delete "one or more".

Column 14, Line 67, Claim 4: after "partially in", delete "computer".

Signed and Sealed this
Twenty-fourth Day of May, 2022

Katherine Kelly Vidal
*Director of the United States Patent and Trademark Office*